(12) United States Patent
Savage, Jr.

(10) Patent No.: US 6,785,053 B2
(45) Date of Patent: Aug. 31, 2004

(54) THREADED LENS COUPLING TO LED APPARATUS

(76) Inventor: John M. Savage, Jr., 538 B. Via de la Valle, Solana Beach, CA (US) 92075

( * ) Notice: Subject to any disclaimer, the term of this patent is extended or adjusted under 35 U.S.C. 154(b) by 0 days.

(21) Appl. No.: 10/259,126

(22) Filed: Sep. 27, 2002

(65) Prior Publication Data

US 2004/0061957 A1 Apr. 1, 2004

(51) Int. Cl.[7] ............................................. G02B 11/00
(52) U.S. Cl. ....................................... 359/642; 359/811
(58) Field of Search ................................ 359/642, 796, 359/800, 811, 819, 822, 829

(56) References Cited

U.S. PATENT DOCUMENTS

| | | | | |
|---|---|---|---|---|
| 4,470,159 A | * | 9/1984 | Peyman | 623/5.11 |
| 5,732,176 A | | 3/1998 | Savage, Jr. | 385/92 |
| 5,990,606 A | * | 11/1999 | Ross | 313/318.01 |
| 6,086,218 A | * | 7/2000 | Robertson | 362/157 |
| 6,293,685 B1 | * | 9/2001 | Polkow | 362/253 |

* cited by examiner

Primary Examiner—Jordan M. Schwartz
(74) Attorney, Agent, or Firm—William W. Haefliger

(57) ABSTRACT

A lens adapted for securement to a holder, for transmission of light, comprising a lens body, defining an axis, threading on the lens body extending about said axis, for reception in threading associated with the holder.

20 Claims, 14 Drawing Sheets

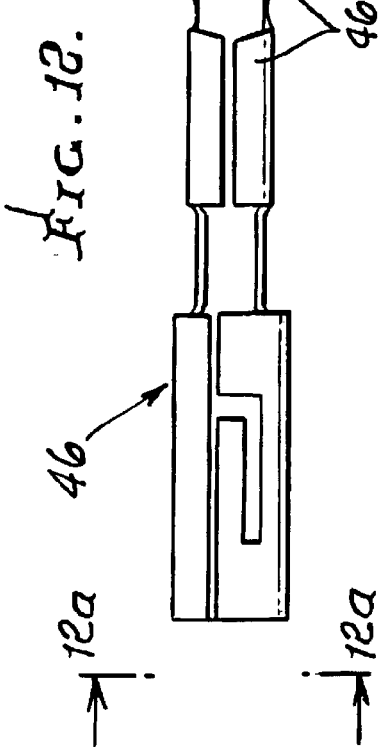
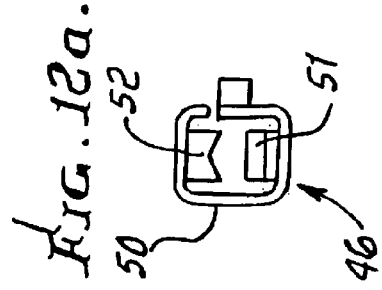
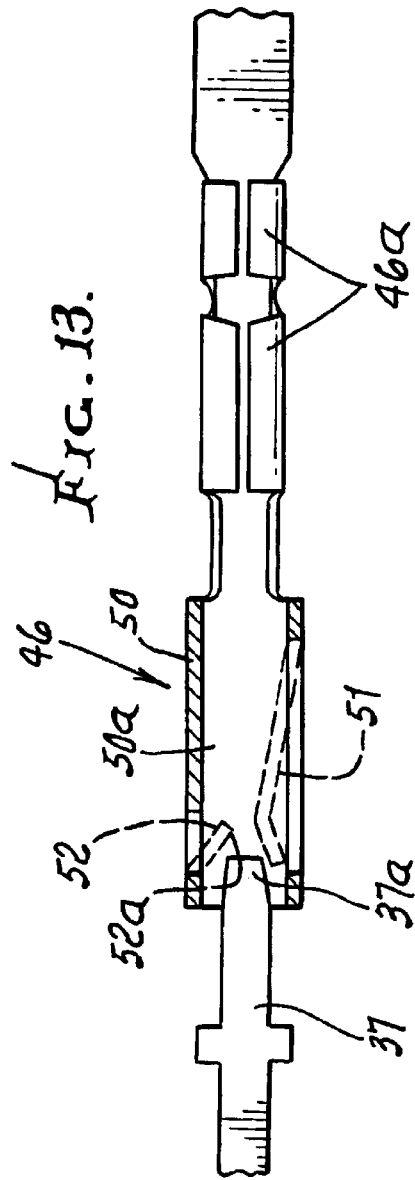

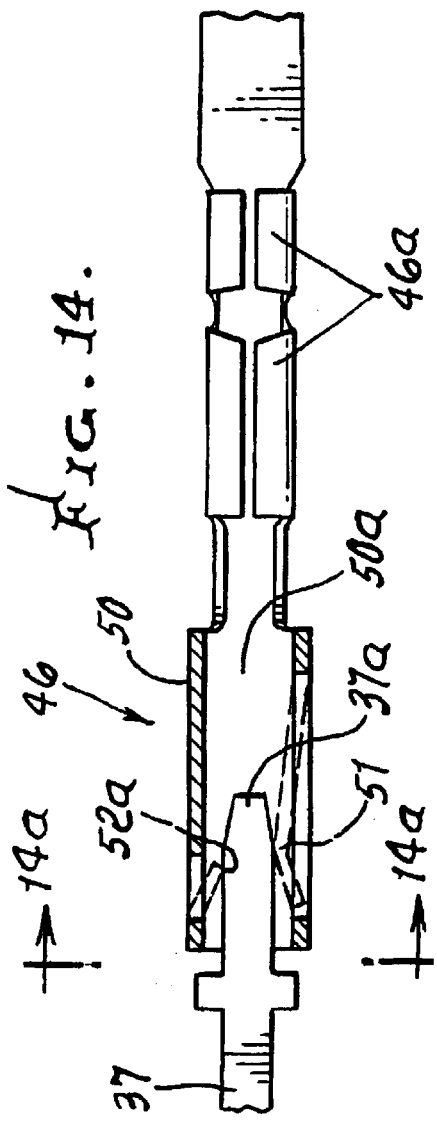
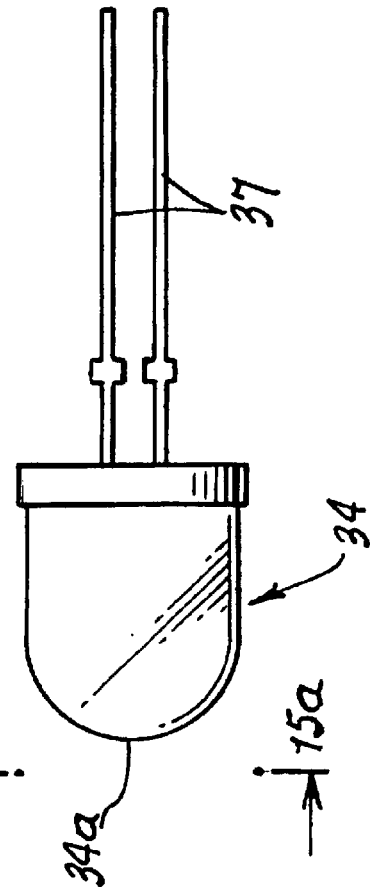
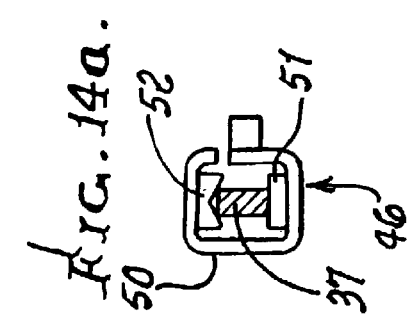
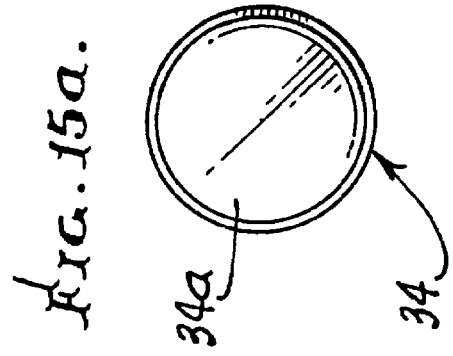

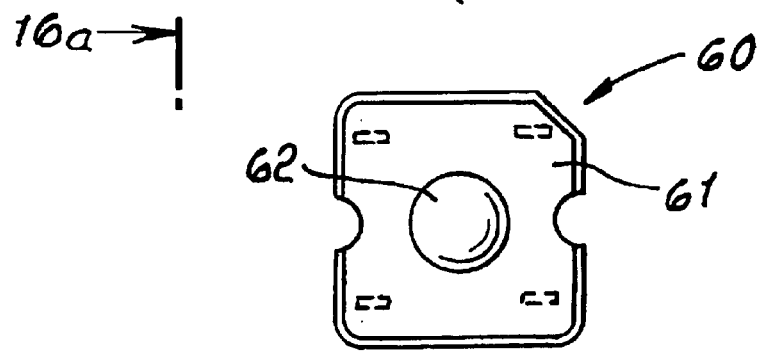
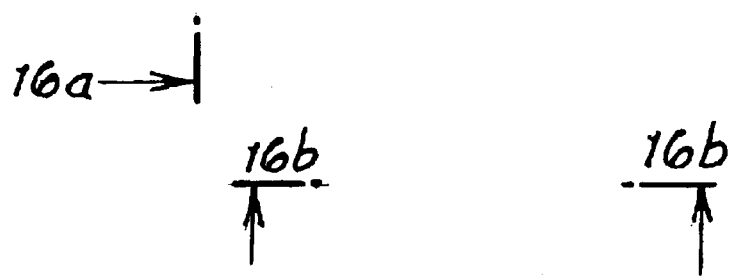
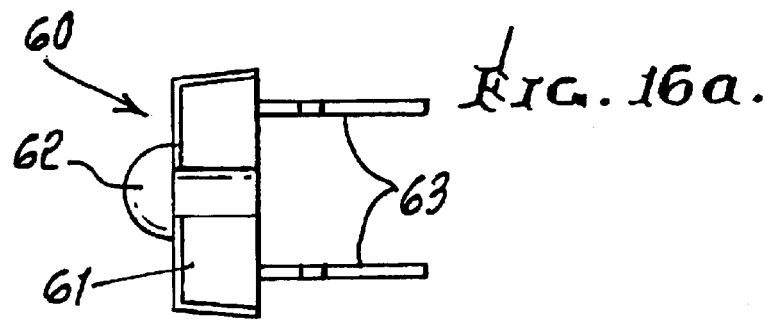
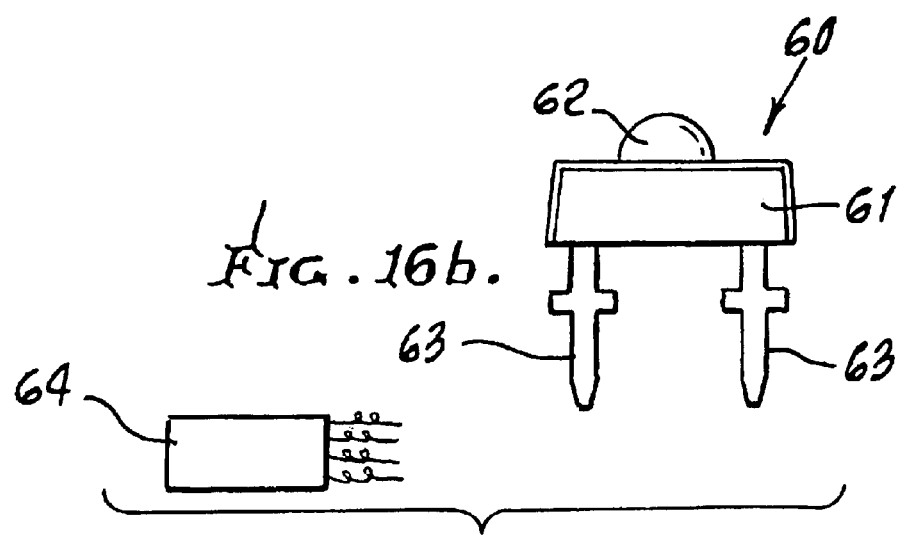

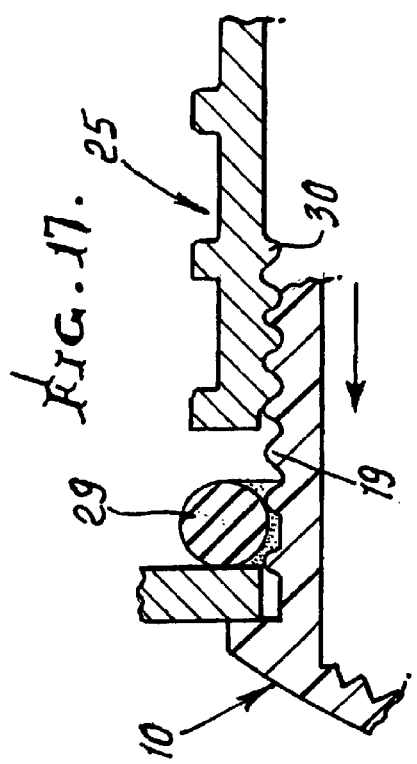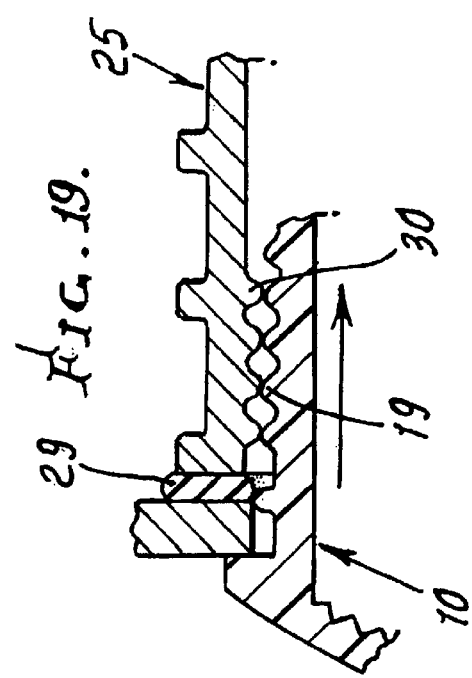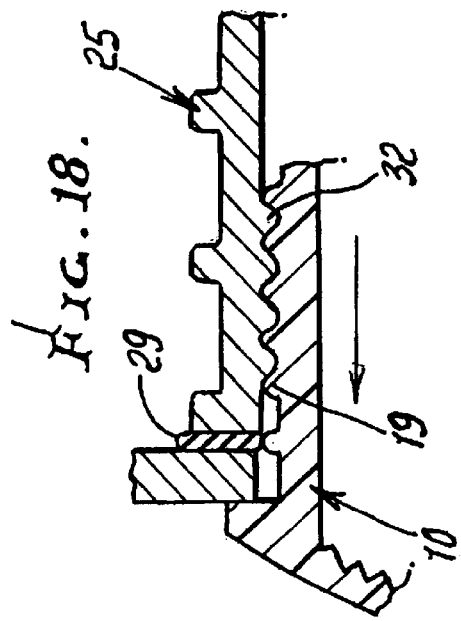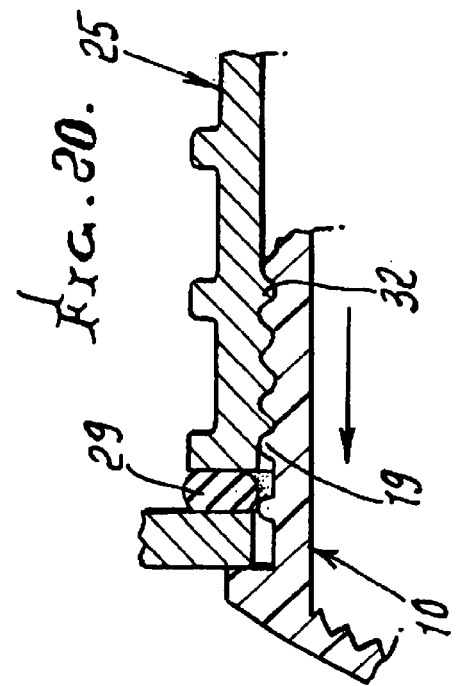

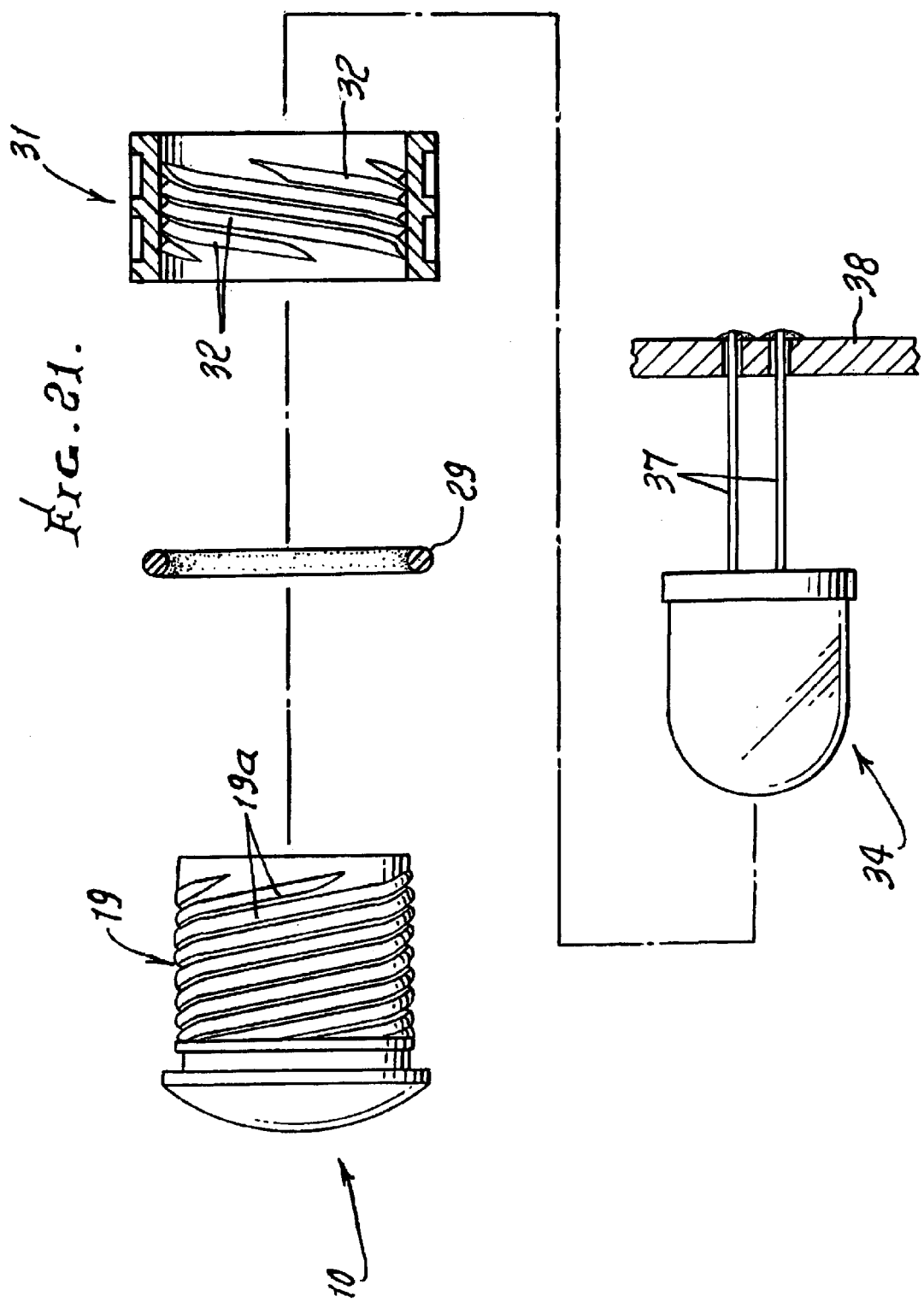

THREADED LENS COUPLING TO LED APPARATUS

BACKGROUND OF THE INVENTION

This invention relates generally to generation and transmission of light, as from an LED source or sources; and more particularly concerns improvements in coupling devices enabling such transmission of light.

There is need for improvements in apparatus and methods to overcome deficiencies and problems with prior coupling system.

SUMMARY OF THE INVENTION

It is a major object to provide improved apparatus and methods as referred to. Basically, the invention provides an improved lens adapted for transmission of light comprising a) a lens body, defining an axis, b) threading on the lens body extending about said axis, for reception in threading associated with the holder.

A further object is to provide threading on the lens body that includes multiple threads extending about said axis. Such threads are typically foreshortened to allow for tightening into the threading associated with the holder in less than about one full turn of the lens relative to the holder.

An additional object is to provide such threads on the lens body that extend only part way about the axis, as for example only about one-half way about the axis. Six such threads may advantageously be provided, to extend peripherally of the body, spiralling about the axis.

Yet another object is to provide a lens holder that extends only part way about said axis. As will be seen, the holder may extend about the lens threading, the holder threading having axial extent greater than the axial extent of such threading on the lens.

A yet additional object includes provision of threading associated with the holder includes multiple threads each having more than one full turn about the lens body, and the threading on the lens body includes multiple threads each having less than one full turn about said axis.

The threading associated with the holder advantageously including six threads each having about two full turns about the lens body, and the threading on the lens body includes six threads each having about one-half full turn about said axis.

A yet further object is to provide lens threads and connector mating threads or retaining ring threads configured to permit the mating parts to be push onto the lens and than with a half a turn to secure the two parts together. This feature prevents the wire leads of the connector from being twisted during installation.

An additional object is to provide thread pitch that allows for the connector or retaining ring and lens to be secured in only one full turn. In this regard connector and retaining ring may have six separate half threads with equally spaced wrap around the diameter. The lens mating six threads typically have two full turns which permits the units to be secured to varying thickness panels for example from a $32^{nd}$ of an inch to $\frac{1}{4}^{th}$ inch thick.

Additionally, the mating lens and connector or retaining ring may be configured to be secured by hand tightening. If the connector or retaining ring are tightened past the secure point then the threads will slip back into a previous thread. This feature prevents the plastic threads of the lens, connector or retaining ring from being stripped. Also, when a rubber grommet is used between the panel and the connector or retaining ring, it functions as a locking unit. As the connector or retaining ring is tightened the grommet will compress. This compression causes backpressure on the threads of the mating parts providing a locking means. When a rubber seal is installed between the lens and the panel it prevents the entry of water and dust through the panel opening.

An added object is to provide for leads of a 10 mm LED to be installed, using A and B entry ports, a terminal being located in each of the chambers beneath the entry ports completing the electrical connection. A four leaded flux LED can be accommodated using the four connector entry ports with their associated terminal contracts. The connector's four box terminals permit electricity to be introduced into three of the four LED leads while the fourth lead is common to all. The LED can then emit a full range of colors by electrically exciting various combinations of the LED leads.

Yet another object is to provide a method of extracting heat from the LED via connector terminals, which prevents over heating and extends the operating life of the device. As will be seen, the LEDs can provide a point source of light. The lens may have Fresnel rings, which disperses the LED point source of light and spreads it over the entire lens surface, providing a wide viewing angle.

These and other objects and advantages of the invention, as well as the details of an illustrative embodiment, will be more fully understood from the following specification and drawings, in which:

DRAWING DESCRIPTION

FIG. 12 is an enlarged view of a receptacle terminal;

FIG. 12a is an end view taken on lines 12a—12a of FIG. 12;

FIG. 13 is an enlarged view of a receptacle terminal receiving endwise reception of a terminal pin;

FIG. 14 is a view like FIG. 13 showing centering and interference connection of the pin to the terminal;

FIG. 14a is an end view taken on lines 14a—14a of FIG. 14;

FIG. 15 is a side elevation showing a plug carrying an LED or LEDs, and having two terminal pins;

FIG. 15a is an end view taken on lines 15a—15a of FIG. 15;

FIG. 16 is a top plan view showing another form of plug carrying an LED or LEDs, and having four terminal pins;

FIG. 16a is a side elevation taken on lines 16a—16a of FIG. 16;

FIG. 16b is a side elevation taken on lines 16b—16b of FIG. 16;

FIGS. 17–20 are enlarged fragmentary sections showing progressive connectors of an interiorly threaded retaining ring to an exteriorly threaded lens, in relation to a mounting panel;

FIG. 21 is axially exploded view of a threaded lens, threaded retainer ring and a locking ring also serves as a moisture seal, this being a preferred application of the threaded lens;

DETAILED DESCRIPTION

Figure 1:
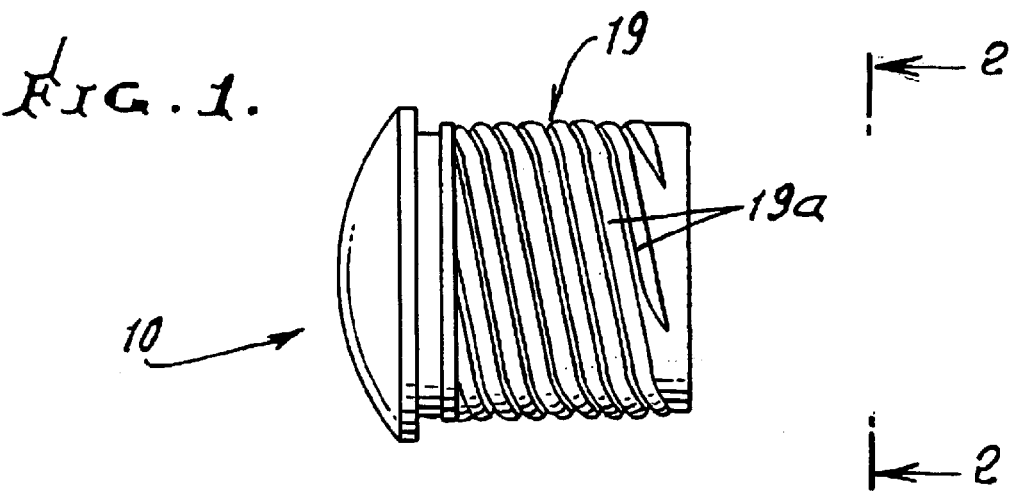
FIG. 1 is a side elevational view of the preferred form of threaded lens.
Figure 2:
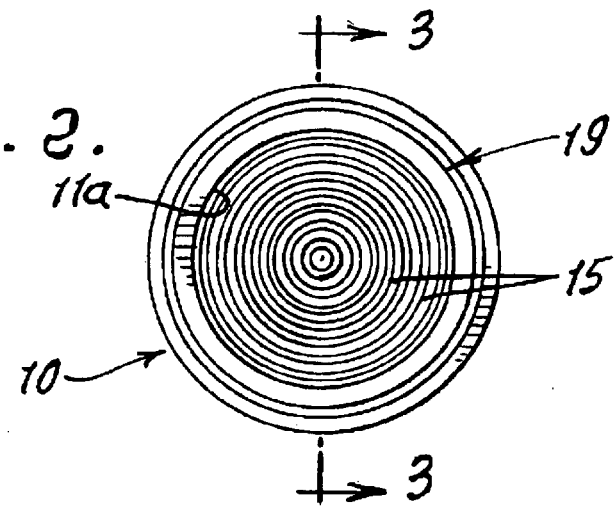
FIG. 2 is an end elevation taken on lines 2—2 of FIG. 1.
Figure 3:
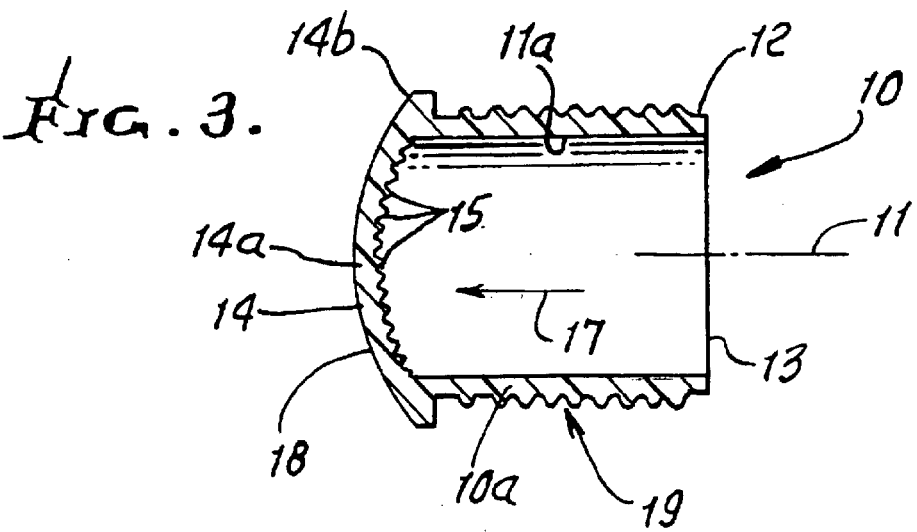
FIG. 3 is a lengthwise section taken on lines 3—3 of FIG. 2.
Figure 4:
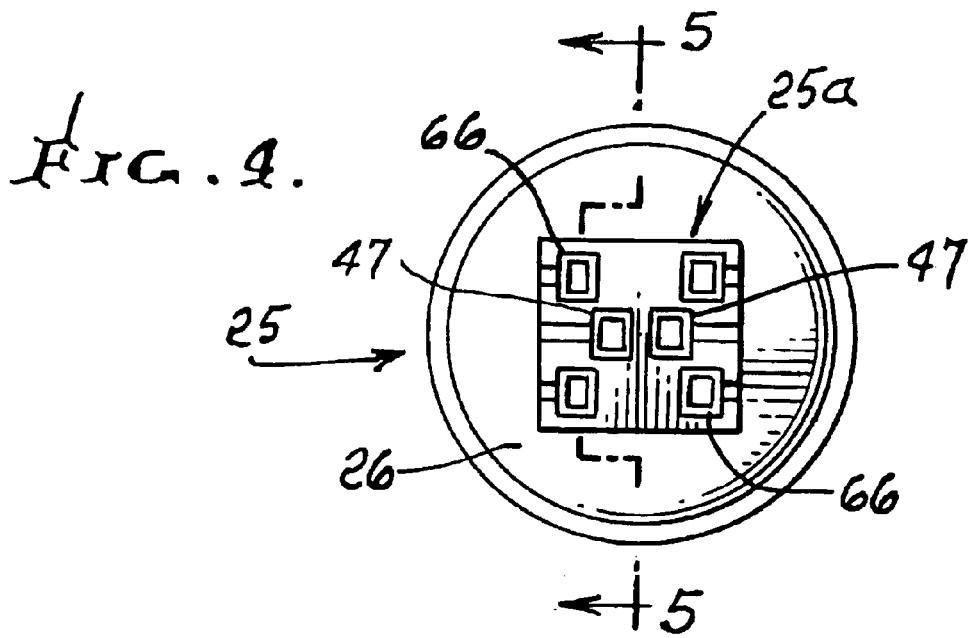
FIG. 4 is a right end elevation of a lens holder, defining a connector having six terminals.

Referring first to FIGS. 1–3, a lens 10 is adapted to be secured to a holder, to be described, for transmission of light, as for example from an LED or LED array. The lens 10 has a body 10a defining a central axis 11, and the body is shown as generally cylindrical defining an inner surface or bore 11a, an outer surface 12, and opposite ends 13 and 14. End 14 is shown in the form of an integral cap having a dome 14a, and an outwardly projecting annular flange 14b. The inner side of the dome defines Fresnel rings 15, for diffracting light rays impinging in direction 17 on the rings, diffused light exiting from the convex outer side 18 of the dome. The body may consist of molded plastic material.

Threading indicated at 19 is formed on the lens body extending about said axis, for reception in threading associated with the holder. Such threading spirals about axis 11, while advancing in direction 17, as shown. Typically, multiple such threads 19a are employed, and are alike. The threads are foreshortened in length to allow for tightening into mating internal threading associated with the holder, to be described, in less than one full rotary turn of the lens 10, relative to the holder. Each thread 19a extends only part way about the axis 11 at the lens body periphery, and preferably six threads 19a are employed, each of which extends only about half way (180°) about axis 11.

Figure 5:
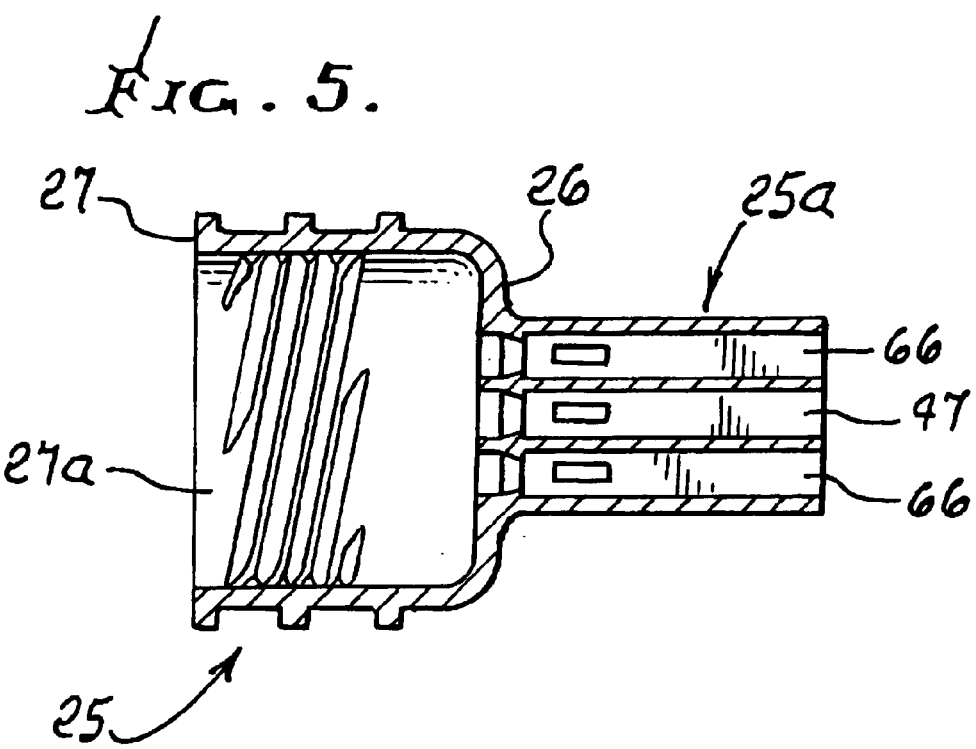
FIG. 5 is a section taken on lines 5—5 of FIG. 4.
Figure 6:
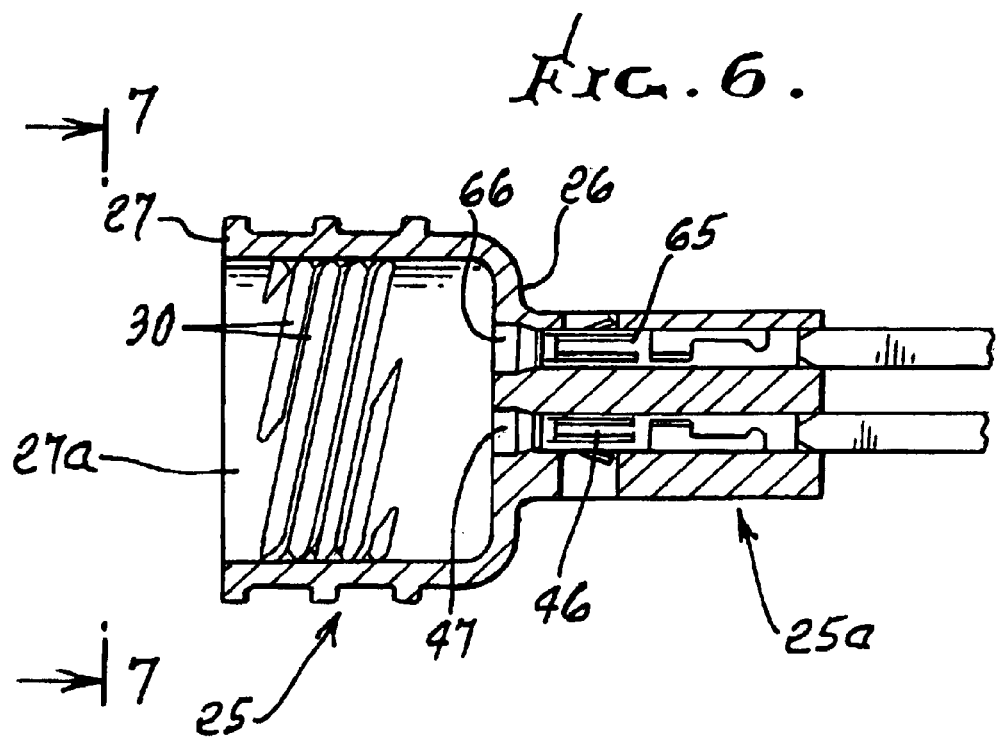
FIG. 6 is a view like FIG. 5, but rotated 90° about an axis defined by the holder.
Figure 7:
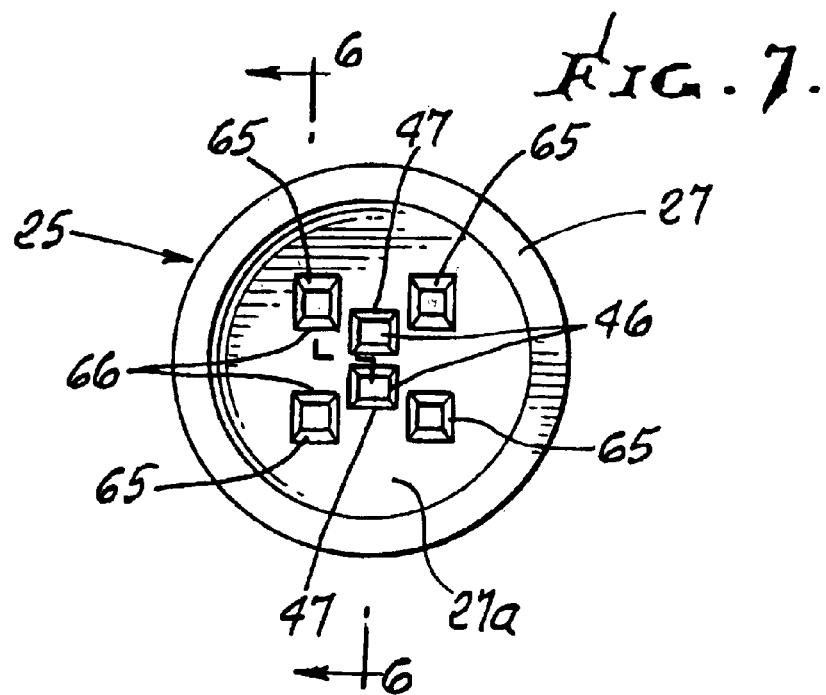
FIG. 7 is a left end elevation of the holder taken on lines 7—7 of FIG. 6.
Figure 24:
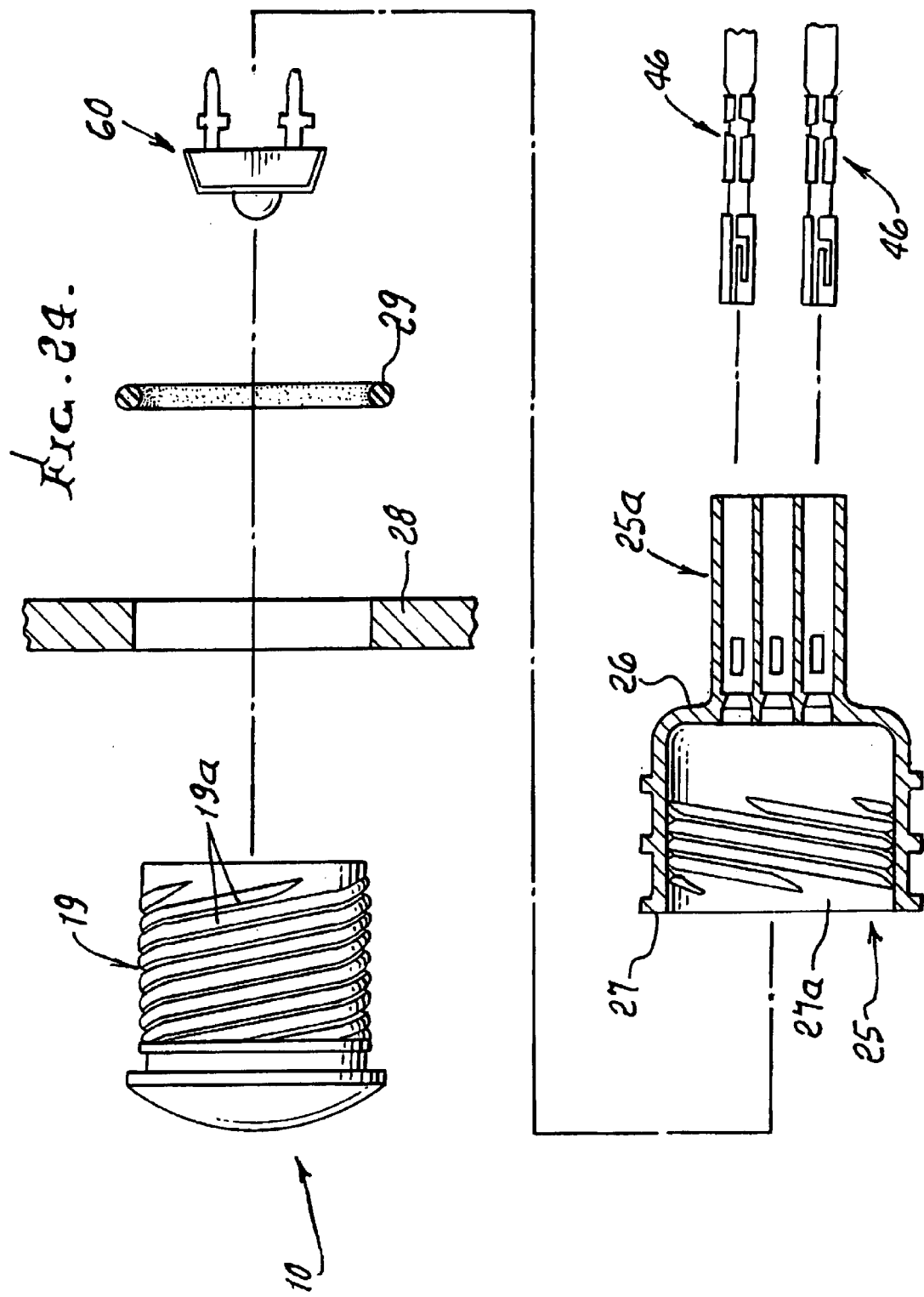
FIG. 24 is an exploded view of a threaded lens, threaded holder with connector terminals, pin terminals; LED plug having four terminals, and locking ring and in relation to a mounting panel.
Figure 25:
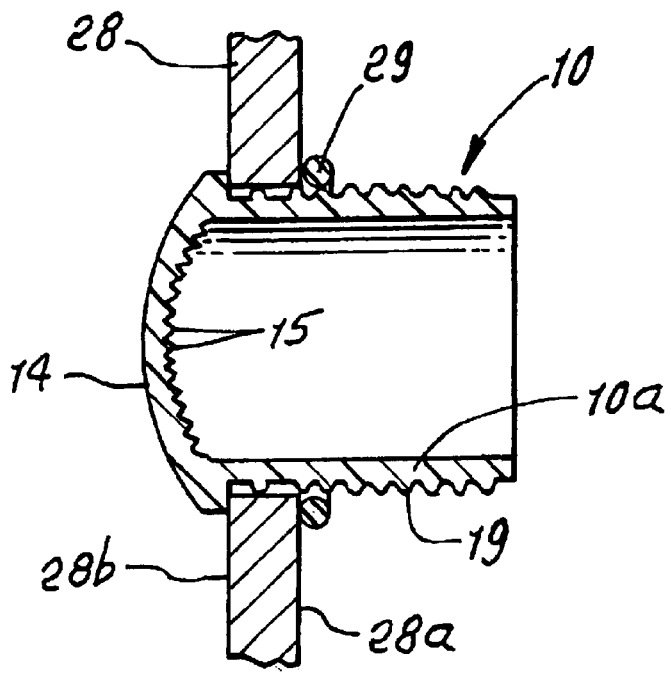
FIG. 25 is a section showing the assembled positioning of the lens, panel and locking ring of FIG. 24.

FIGS. 5, 6 and 24 show one form of lens holder 25, which is also integral with a reduced diameter connector 25a at one end 26 of the holder. The opposite end 27 of the holder is centrally open at 27a, for threaded reception of the lens body 10a, as the holder is rotated. At that time, the lens is typically retained by or mounted to a panel 28, as shown in FIG. 25, with a locking ring 29 mounted on the lens body and engaging wall 28a of the panel, and lens flange 14b engaging the opposite wall 28b of the panel.

Figure 8:
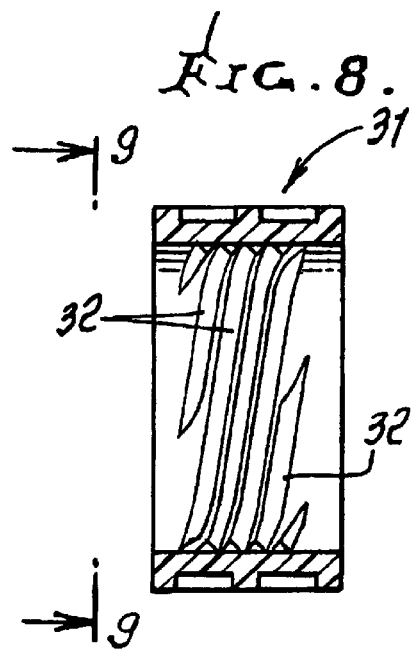
FIG. 8 is a section taken through an alternative lens holder in the form of an interiorly threaded retaining ring.
Figure 9:
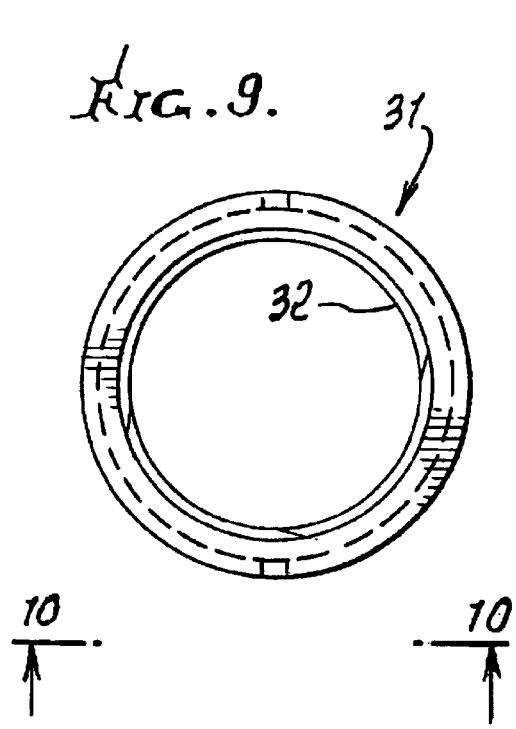
FIG. 9 is an end view of the FIG. 8 ring, taken on lines 9—9 of FIG. 8.
Figure 10:
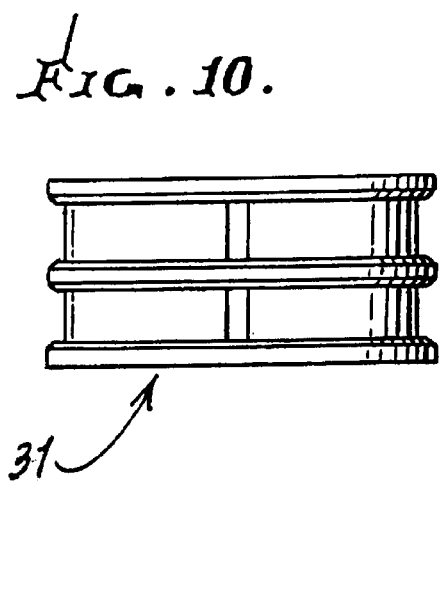
FIG. 10 is a side elevation taken on lines 10—10 of FIG. 9.
Figure 11:
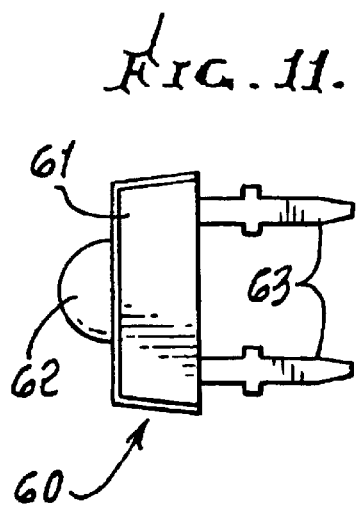
FIG. 11 is a side view of a terminal plug with four pins useful to plug into four receptacle terminals as seen in FIG. 4.

FIGS. 17–20 and 21–23 also show provision of a modified lens holder in the form of a retaining ring 31. That ring has internal threads at 32, the same as the internal threads 30 the holder 25. See also FIGS. 8–10.

Lens threads and connector mating threads 30 or retaining ring threads are formed to permit the mating parts to be pushed onto the lens and then with a half a turn, secure the two parts together. This feature prevents the wire leads protruding from the connector as at 85 from being twisted during installation. Additional turning of the connector during assembly would tend to cause excessive torque on the wires, which would cause an opposing twisting action on the connector.

The pitch of the threads allows for the connector or retaining ring and lens to be secured in only one full turn. The connector and retaining ring typically have six separate half threads, equally spaced wrap around the diameter. The lens mating six threads have two full turns which permits the units to be secured to varying panels from a $32^{nd}$ of an inch to $\frac{1}{4}^{th}$ inch thick.

The mating lens and connector or retaining ring are configured to be secured by hand tightening. If the connector or retaining ring are tightened past the secure point, then the threads will slip back onto a previous thread, as by over-crest slippage seen in FIGS. 19 and 20. This feature prevents the plastic threads of the lens, connector or retaining ring from being stripped.

When a rubber grommet is used between the panel and the connector or retaining ring it functions as a locking unit. As the connector or retaining ring is tightened the grommet will compress. This compression causes backpressure on the threads of the mating parts providing a locking means.

When a rubber seal is installed between the lens and the panel it prevents the entry of water and dust through the panel opening.

FIGS. 17–20 show the thread interfitting sequence of the lens and holder elements, and the functioning of the compressible locking ring 29, which may consist of elastomeric material, such as rubber.

Figure 22:
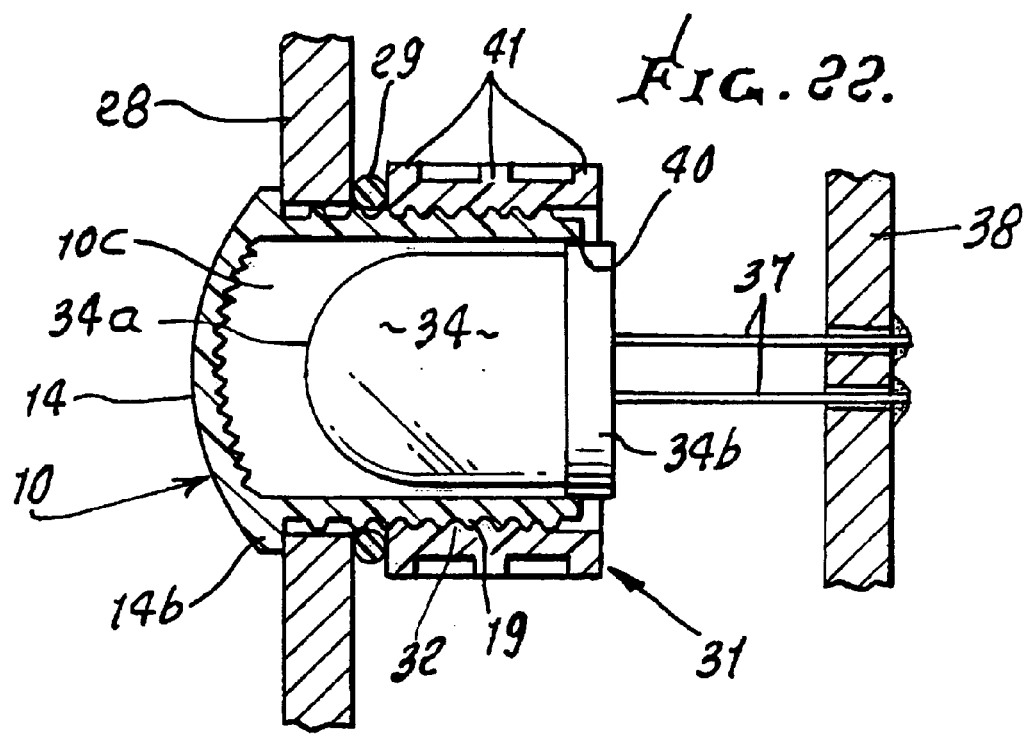
FIG. 22 is a view of the FIG. 21 components, in axially assembled relation.
Figure 23:
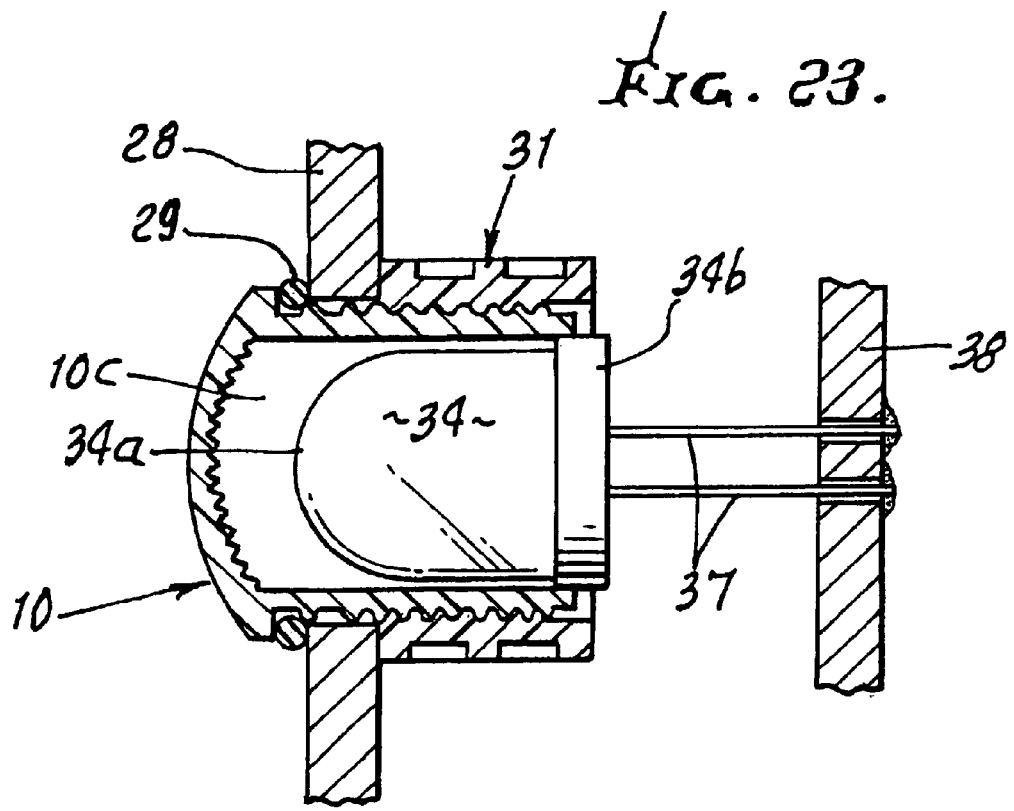
FIG. 23 is a view like FIG. 22, showing the locking ring and moisture seal component assembled in an alternate position.

Note in FIGS. 22 and 23 the reception of an LED plug type unit 34 into the interior 10c of the lens 10, with the dome 34a of unit 34 proximate the Fresnel rings at the concave interior side of the lens cap end 14. The leads 37 of the LED unit project from or through a circuit board 38 to which the leads are mounted, to support the unit 34. A flange 34b on unit 34 is closely received in the bore of the lens, at location 40, for centering. The lens has threaded attachment to the holder 31 as shown, and as described above. Holder ring 31 includes integral annular stiffeners 41 projecting outwardly. Ring 31 may consist of molded plastic material.

Figure 27:
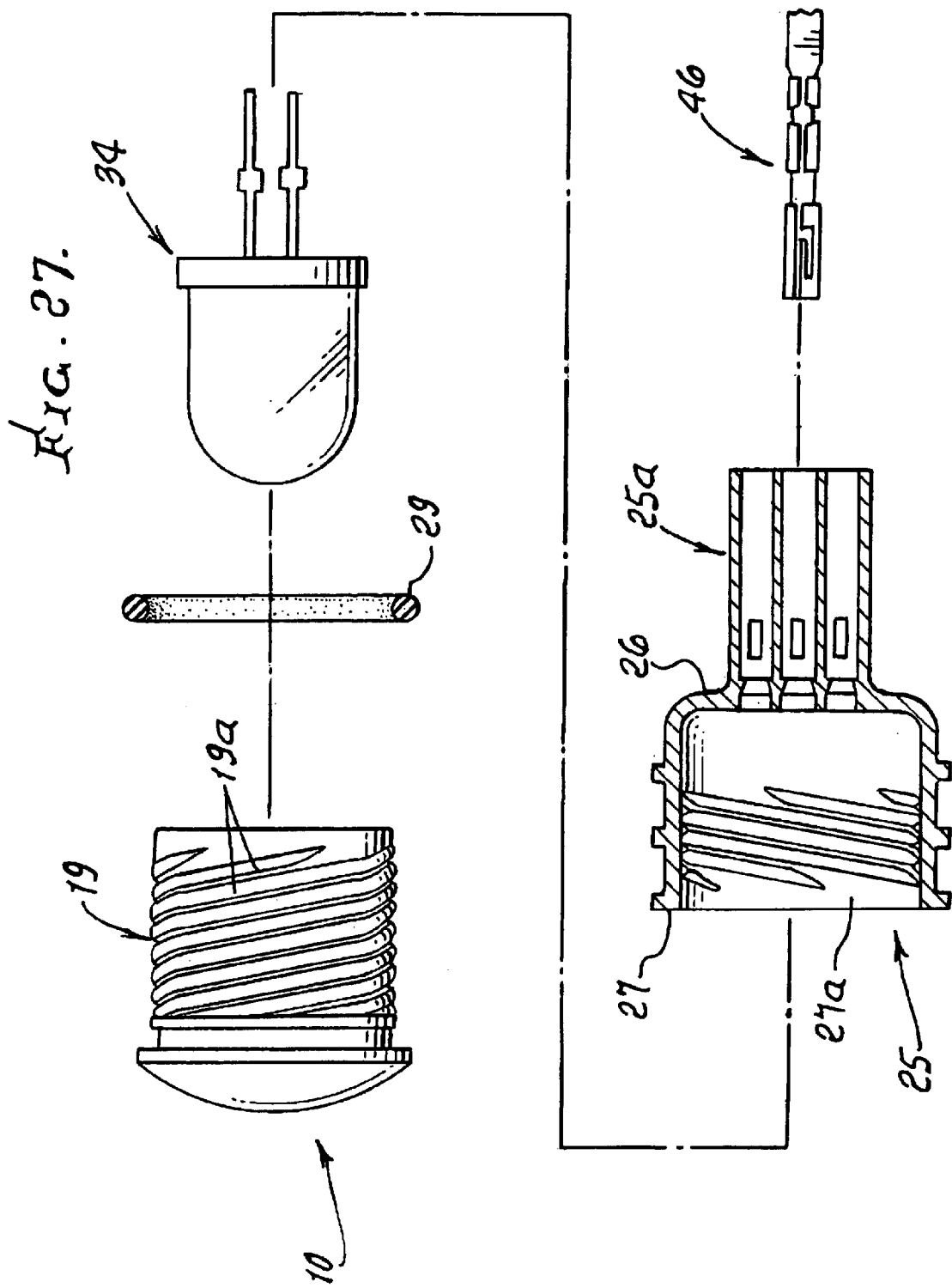
FIG. 27 is an axially exploded view of a threaded lens, threaded holder with connector terminals; pin terminals, the LED plug having two terminals; and locking ring, in relation to a mounting panel.
Figure 28:
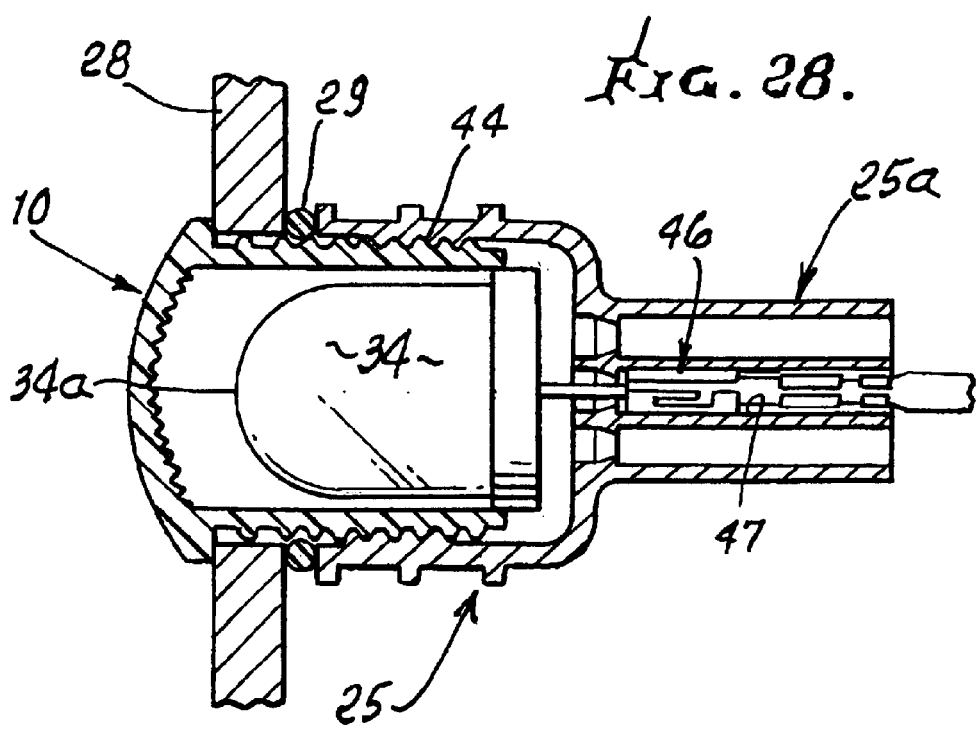
FIG. 28 is a section showing assembled positioning of the holder, locking ring, LED plug, connector receptacle terminals and supply power pin terminals, of the FIG. 27 components.
Figure 29:
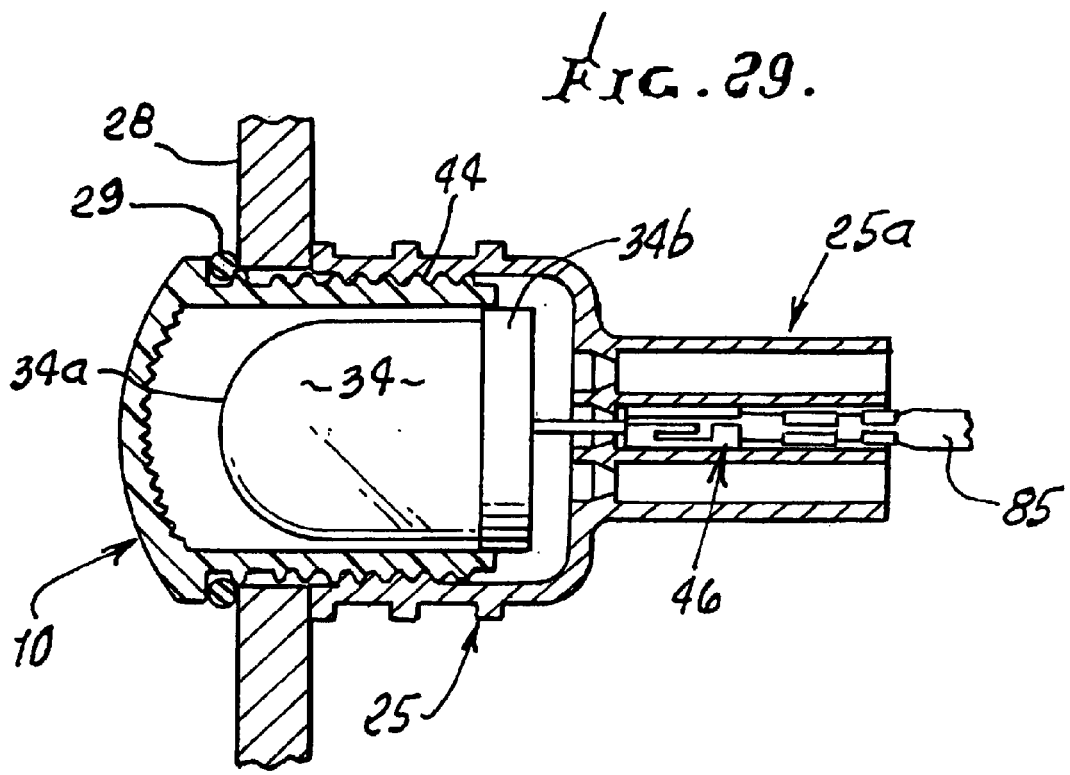
FIG. 29 is like FIG. 28, but showing the locking ring in position forward of the mounting panel.

FIGS. 27 and 28 show the plug type LED unit 34 assembled to a connector 25a as described above, the internal threads of holder 25 assembled to the lens threads at 44. The domed end 34a of unit 34 is received into the lens interior as described above; and locking ring 29 is held in compressed condition between the left end face of the holder and the panel 28. The two pins or leads 37 of the LED unit are received into two parallel female terminals 46 received into and carried by slots 47 in the connector 25a.

FIGS. 12–14 show progressive reception of a pin or lead 37 into a terminal 46. The tapered end 37a of the pin or lead penetrates into the tubular body 50 of the terminal, and between tapered guide 51 and internal barb 52. The guide and barb project laterally into the interior 50a of the body 50, with the guide slidably guiding the pin, and the barb 52 having an edge 52a riding along the side of the pin, with friction, to center the pin in the interior 50a. Edge 52a also gouges into the side of the pin to block endwise retraction or loosening of the pin from the terminal. Both 51 and 52 are resilient cantilever spring fingers. Wiring is retained to 46 at 46a.

Figure 26:
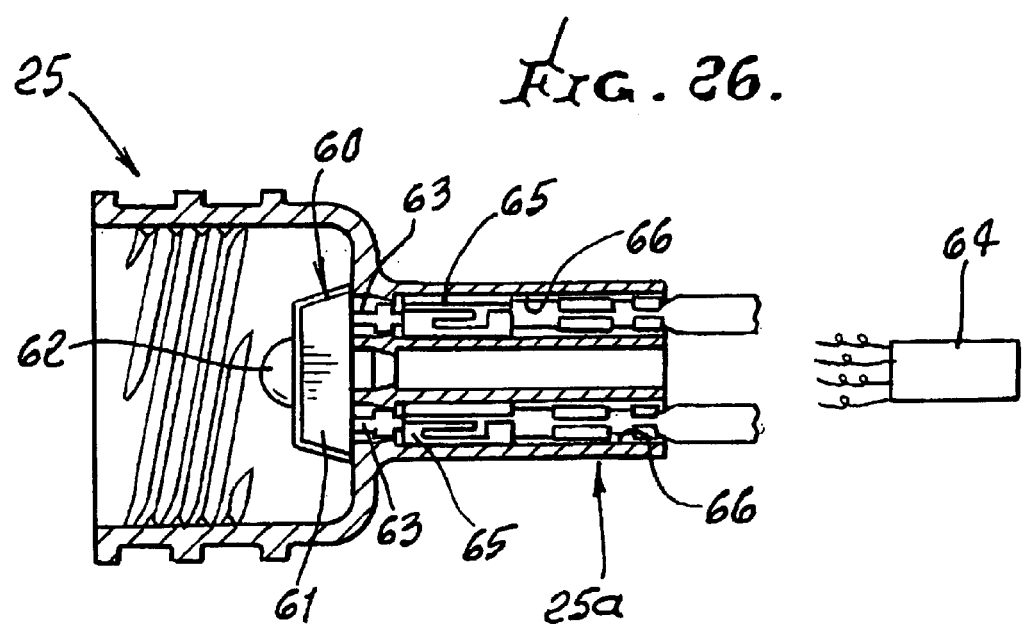
FIG. 26 is a section showing the assembled positioning of the holder, LED plug, connector receptacle terminals, and supply power pin terminals.

Another form of LED unit is seen at 60 in FIGS. 11, 16, 16a and 16b. Unit 60 has a polygonal body 61, a domed end 62 from which light is emitted, and four pins 63 located at corners of a square. Those pins or leads are adapted to receive controlled electrical energization as from a circuit 64, to control different colored light emission from three LEDs in the unit, the fourth pin being a common or ground. Color emission from unit 60 can thereby be controlled, by light color mixing within 60, for emission from domed end 62. FIGS. 24 and 26 show pins or leads 63 endwise received within, and electrically connected, to four female terminals 65. The latter are in turn received in four slots 66 in the connector 25a. A control circuit appears at 64, as in FIG. 16. See also FIGS. 5 and 6.

The connector 25a of FIGS. 4–7 is configured to receive the pins of either type LED unit, 34 or 60, i.e. it has four slots 66 at corners of a square, to receive the four terminals 65 of a unit 60. It also has two slots 47 to receive terminals 46 of a unit 43. Slots 47 are located within the square (see FIG. 7) defined by slots 66. A highly versatile and compact connector 25a is thereby provided.

The connector terminals also provide a method of extracting heat from the LED, which prevents over heating and extends the operating life of the device.

I claim:

1. A lens adapted for securement to a holder, for transmission of light, comprising
   a) a lens body, defining an axis,
   b) threading on the lens body extending about said axis, for reception in threading associated with the holder,
   c) and including said holder that extends about the lens and is configured to expand in response to interfering engagement of the threading on the lens body with said threading associated with the holder, allowing thread slippage to limit tightening of the holder onto the lens,
   d) there being an axially compressible grommet on the lens to be resiliently compressed as the holder is tightened on the lens body, creating pressure and locking friction at thread to thread interengagement locations.

2. The lens of claim 1 wherein said threading on the lens body includes multiple threads extending about said axis.

3. The lens of claim 2 wherein said threads are foreshortened to allow for tightening into the threading associated with the holder in less than about one full turn of the lens relative to the holder.

4. The lens of claim 2 wherein said multiple threads on the lens body extend only part way about said axis.

5. The lens of claim 2 wherein said multiple threads on the lens body extend only about half way about said axis.

6. The lens of claim 4 wherein there are six of said threads on the lens body.

7. The lens of claim 5 wherein there are six of said threads on the lens body.

8. The lens of claim 1 wherein said lens body is generally cylindrical, and said threading on said body extends peripherally of said body, and spirals about said axis.

9. The lens of claim 6 wherein said lens body is generally cylindrical, and said threading on said body extends peripherally of said body, and spirals about said axis.

10. The lens of claim 8 including a light transmitting cap on said body at one end thereof.

11. The lens of claim 1 wherein the threading associated with the holder has axial extent greater than the axial extent of said threading on the lens.

12. The lens of claim 11 wherein the threading associated with the holder includes multiple threads each having more than one full turn about the lens body, and the threading on the lens body includes multiple threads each having less than one full turn about said axis.

13. The lens of claim 11 wherein the threading associated with the holder includes six threads each having about two full turns about the lens body, and the threading on the lens body include six threads each having about one-half full turn about said axis.

14. The lens of claim 1 wherein the holder comprises a locking ring.

15. The lens of claim 1 including said holder, an LED or LEDs in end alignment with the lens and a plug carrying the LED or LEDs, within the holder.

16. A lens adapted for securement to a holder, for transmission of light, comprising
    a) a lens body, defining an axis,
    b) threading on the lens body extending about said axis, for reception in threading associated with the holder,
    c) and including said holder, an LED or LEDs in end alignment with the lens and a plug carrying the LED or LEDs, within the holder,
    d) and wherein the plug has pins, and there being multiple female terminals carried by the holder, with less than all of said terminals receiving said pins.

17. The lens of claim 16 wherein said holder extends about the lens and is configured to expand in response to interfering engagement of the threading on the lens body with said threading associated with the holder, allowing thread slippage to limit tightening of the holder onto the lens.

18. The lens of claim 16 wherein there are six of said female terminals, said pins on the plug being one of the following:
    i) two pins
    ii) four pins.

19. The lens of claim 16 including circuitry to provide selected current or voltage level energization to the LED or LEDs, via such pins.

20. The lens of claim 18 including circuitry to provide selected current or voltage level energization to the LED or LEDs, via such pins.

* * * * *